Nov. 21, 1961   J. L. GIOVANNUCCI   3,009,241
PROCESS OF MAKING ALL-METAL HONEYCOMB LAMINATE
Filed Aug. 27, 1956   3 Sheets-Sheet 3
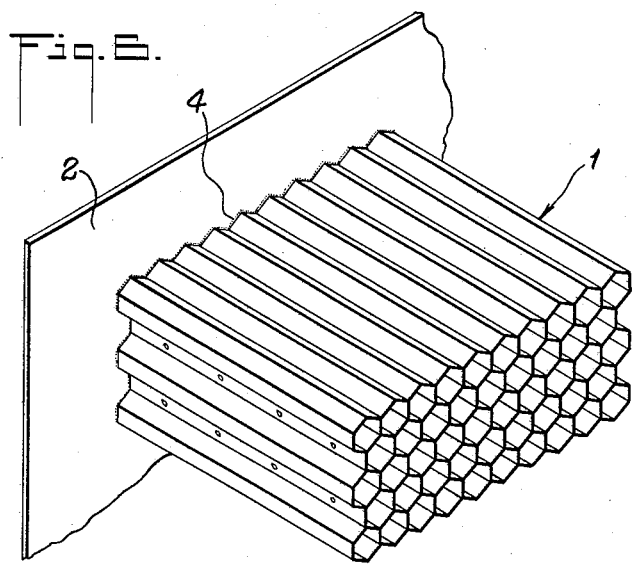
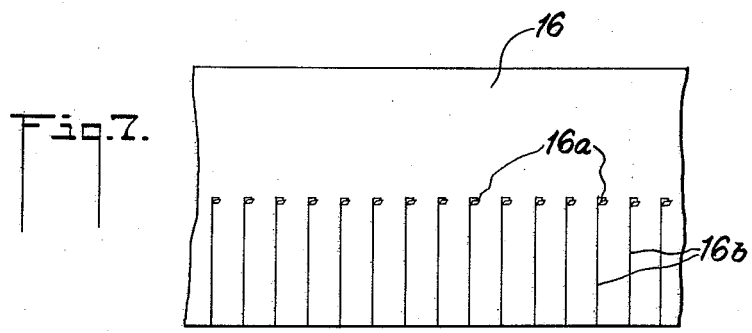
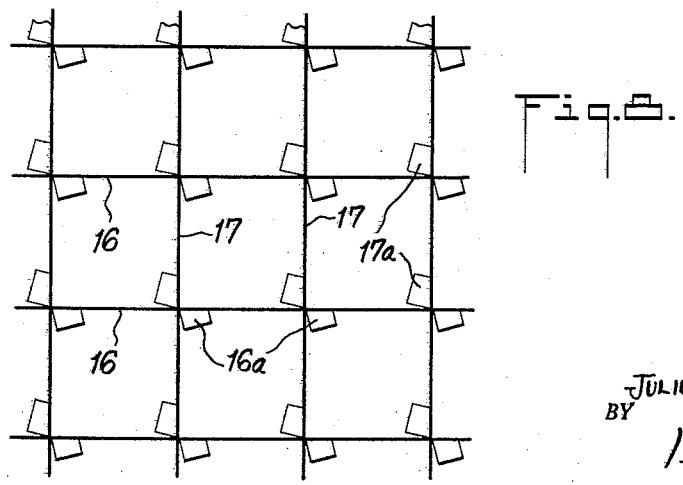
INVENTOR.
JULIUS L. GIOVANNUCCI
BY
Kenyon & Kenyon
ATTORNEYS

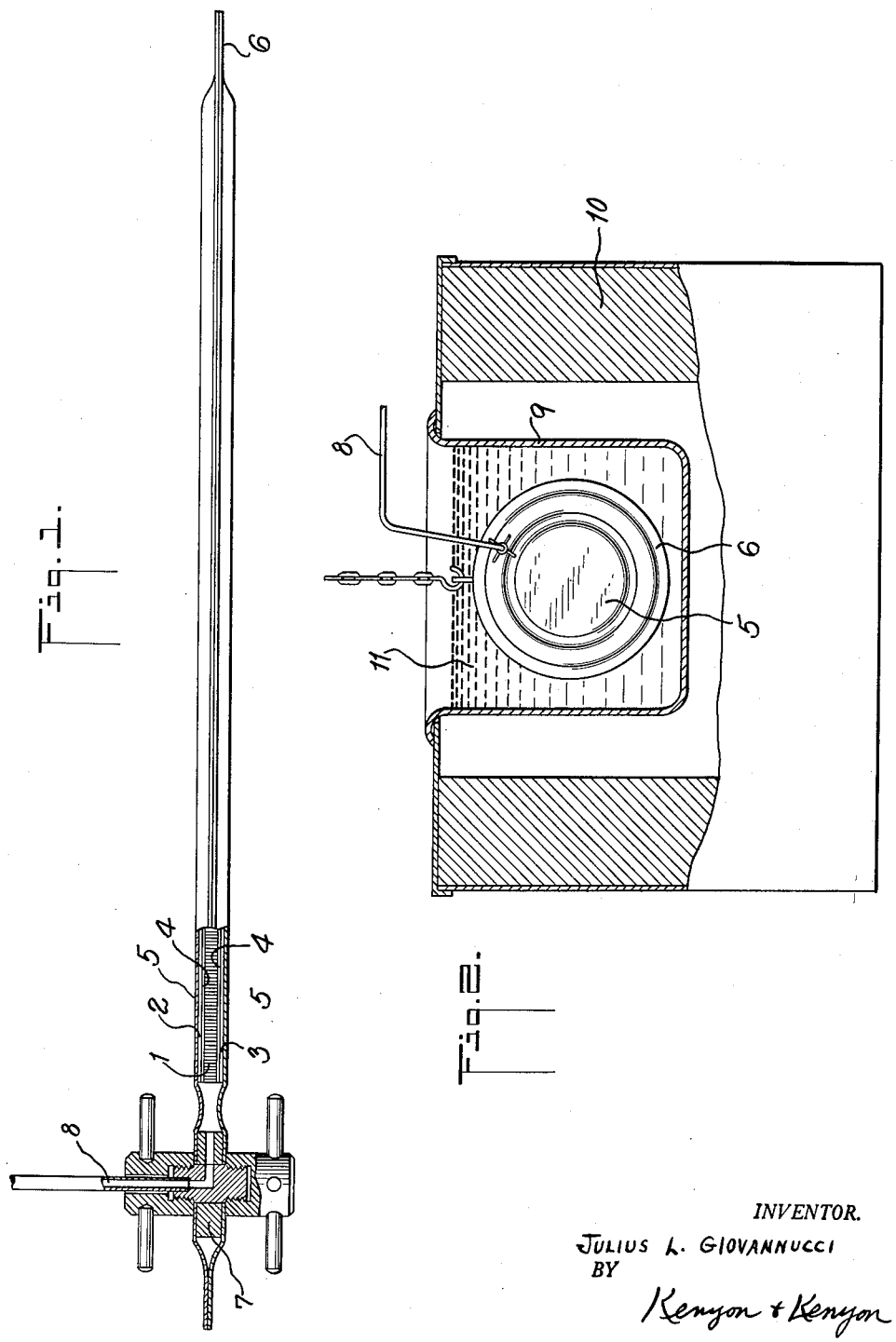
Nov. 21, 1961     J. L. GIOVANNUCCI     3,009,241
PROCESS OF MAKING ALL-METAL HONEYCOMB LAMINATE
Filed Aug. 27, 1956     3 Sheets-Sheet 1
INVENTOR.
JULIUS L. GIOVANNUCCI
BY
Kenyon & Kenyon
ATTORNEYS

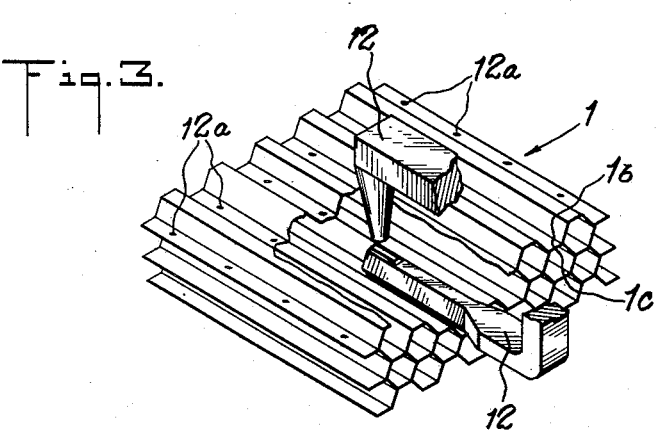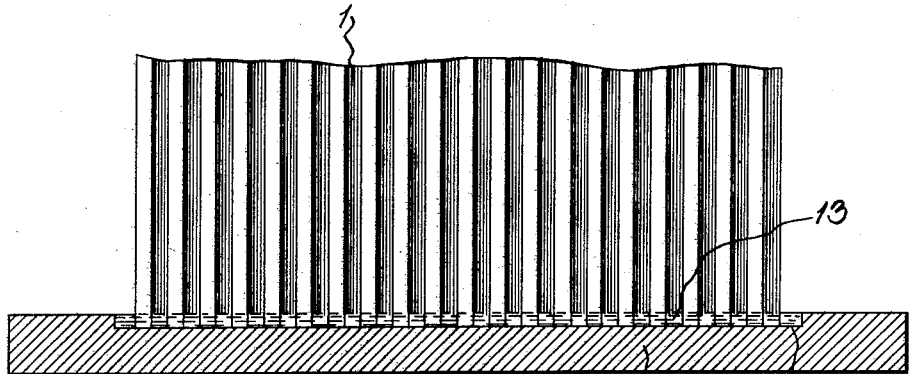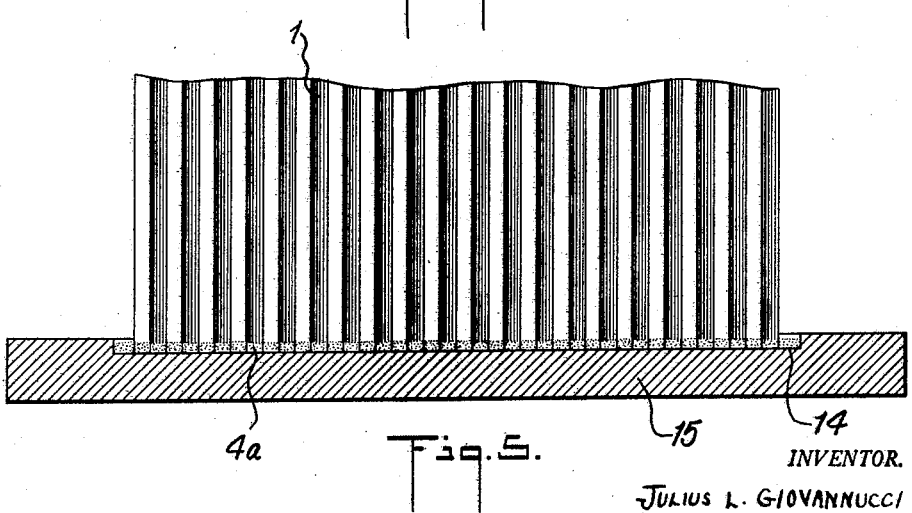

United States Patent Office 3,009,241
Patented Nov. 21, 1961

3,009,241
PROCESS OF MAKING ALL-METAL HONEY-COMB LAMINATE
Julius L. Giovannucci, Stratford, Conn., assignor to National Distillers and Chemical Corporation, a corporation of Virginia
Filed Aug. 27, 1956, Ser. No. 606,325
8 Claims. (Cl. 29—455)

This invention relates to a process for making honeycomb laminate. Heretofore honeycomb laminate has incorporated non-metallic material to some extent at least and this has detracted from its value as a light-weight material of great structural stiffness.

The main user of honeycomb laminate today is the aircraft airframe industry. Modern designs and operational conditions require the use of panels of great stiffness but light in weight. This has led to the development of honeycomb laminate which comprises a honeycomb as the middle lamination and metal sheets as the two outer laminations, the sheets being joined to the edges of the honeycomb. Either or both the honeycomb and the bonding material used to bond the parts together has heretofore been of a nonmetallic character. Obviously this is not desirable for many reasons.

The primary object of the present invention is to commercially provide a honeycomb laminate made entirely of metal throughout, this including all of the laminations and all of the bonds required to interfasten the laminations and to make the honeycomb laminations. Other objects will become apparent from the following disclosure of specific examples of this invention.

Very briefly, according to the present invention an all-metal honeycomb lamination is assembled and at least the edges of this honeycomb lamination are wet with a liquid to which powdered brazing metal will adhere. While this liquid remains wet on the edges this lamination is immersed in powdered brazing metal the particles of which adhere to the edges of the honeycomb lamination. Ordinarily the liquid is then dried or allowed to dry so that the brazing powder particles are in effect glued to the edges. Metal sheet outer laminations are then superimposed on the edges of the honeycomb lamination.

The above assembled but unbrazed laminate is placed in an enclosure or envelope providing flexible sheet metal diaphragms or walls which overlie the sheet components of the laminate. This enclosure is then evacuated so that the atmospheric pressure flexes its diaphragms or walls inwardly so as to in turn flex the sheet metal laminate components against the edges of the honeycomb laminate, this placing and holding these parts in abutting relation substantially throughout their entire extent. The enclosure is also made of metal throughout so that it may be subjected to brazing such as by immersing the entire enclosure in a molten salt bath maintained at a suitable temperature. Since only thin walls separate the brazing metal from the applied heat the brazing is effected rapidly. By maintaining the evacuation during this brazing and thereafter until the brazing metal solidifies, the abutting relationship previously described is effectively maintained. Solidification is rapid because the brazing metal is separated from any cooling medium used again only by the thin metal walls and sheets. The resulting all-metal laminate is then removed from the enclosure.

Certain modifications are possible and may prove very desirable. For example, the hydrogen copper brazing method may be used by causing hydrogen to flow through the enclosure at sub-atmospheric pressure, taking care to maintain the pressure differential required to keep the parts in their abutting relation. The invention further embraces novel methods of making the honeycomb lamination component.

Specific examples of the present invention are illustrated by the accompanying drawings in which:

FIG. 1 is a partially sectioned view of the described laminate assembly located within the evacuated enclosure;

FIG. 2 shows this enclosure immersed in a molten salt bath;

FIG. 3 shows one form of the honeycomb lamination as it is being made;

FIG. 4 is a vertical section showing the wetting of the edges of the honeycomb lamination;

FIG. 5 shows the immersion in the powdered brazing metal;

FIG. 6 illustrates in perspective the finished laminate as it would appear if its honeycomb lamination were cut through to expose the internal construction;

FIG. 7 is a side view showing a modification of the honeycomb lamination; and

FIG. 8 is a top or plan view of FIG. 7.

Referring first to FIG. 1, the honeycomb lamination 1 is shown with the upper sheet lamination 2 and lower sheet lamination 3 abutting the edges of the lamination 1. The brazing metal, in exaggerated dimensions, is shown at 4. This assembly is located within the enclosure formed by the flexible metal walls 5 which have their peripheral edges welded together at 6, a stout piece of metal forming a strut 7 encircling the parts 1, 2 and 3. The walls 5 together with the struts 7 form the airtight enclosure, and a suitable connection 8 is provided so that this enclosure may be exhausted. The walls 5, or diaphragms, are of relatively thin gauge metal sheet material so that they flex under the atmospheric pressure and flex the laminations 2 and 3 against the edges of the lamination 1.

It is to be understood that the sheet laminations 2 and 3 are very thin, this also applying to the walls of the lamination 1. For example, the honeycomb lamination may be made from .0015″ thick stainless steel sheet or strip, and the outer sheet laminations or skins may be made from stainless steel .010″ thick. These are merely examples to show the metal gauges involved. Aluminum alloy or other metals may be substituted for the stainless steel as to any or all of the laminate components.

The enclosure of FIG. 1 functions as a fixture which holds the laminations together and which may be handled by a sling and crane system, for example. The vacuum inside of the enclosure may be continuously maintained because the connection 8 may take the form of a stainless steel tube, for example.

With the evacuation maintained this fixture is next dropped into a molten salt bath as shown by FIG. 2. This figure shows the usual pot 9 supported in a heating furnace 10 and containing molten salt 11. As previously indicated, hydrogen at sub-atmospheric pressure, or other gas may be circulated through the enclosure during this heating phase providing that the pressure differential between the inside and outside of the enclosure or fixture remains adequate to keep the laminations firmly pressed together. Ordinarily this brazing heat phase may be very short in time because there is so little metal separating the brazing metal 4 from the molten salt. This is likewise true if other forms of heating are used.

As soon as the brazing metal becomes liquid the fixture may be removed from the heating zone and allowed to either cool naturally or be quenched such as in a liquid quenching bath. At this time atmospheric pressure may be admitted to the enclosure and the latter opened so that the finished laminate may be removed. This is, of course, all-metal laminate free from the objections incidental to the use of either or both a non-metallic honeycomb lamination or non-metallic bonding agents.

In general outline the finished product will ordinarily be rectangular, this meaning that the enclosure or fixture previously described ordinarily would have a rectangular outline when viewed in plan. However, it is obvious that special contours may be obtained when desired. The finished article normally has considerably greater stiffness and resistance to abuse than the partly non-metallic honeycomb laminates of the prior art.

Going now to FIG. 3, one mode of making the all-metallic honeycomb lamination is by using corrugated metal strip assembled so that the valley portions 1b of one strip contact the hill portions 1c of the next strip, these portions all being arranged parallel to each other. Then by using spot welding tools 12 supplied with suitable mechanical pressure and electrical current, the portions 1b and 1c are spot welded together at a plurality of spots 12a. This is done layer after layer until the desired extent of honeycomb lamination is produced. The width of the corrugated strips, of course, determine the thickness or depth of the honeycomb lamination.

In FIG. 4 such an assembled honeycomb lamination is shown being dipped edgewise into a shallow layer of the described liquid 13 which is formed by being levelled off in an appropriately shallow depression 14 formed in a dish 15 and capable of accepting the entire honeycomb lamination in an edgewise manner. This flux 13 is preferably a water solution of a brazing flux since this assists the brazing action and after drying causes the powdered brazing flux to adhere with adequate firmness.

FIG. 5 shows the same dish 15 being used this time to hold the shallow layer of powdered brazing metal 4a. The honeycomb lamination is, of course, immersed in this shallow layer of metal powder while it is still wet with the liquid or water-flux solution 13, and when the lamination is removed the powdered brazing metal particles adhere to the edge portions of the lamination so that after drying the powder is in position and located just where it is needed.

The next step may comprise simply superimposing the sheets 2 and 3 and constructing the enclosure of FIG. 1 about the resulting assembly. This goes back to the early part of the description which results in the finished all-metal laminate.

Another form of the all-metal honeycomb lamination is shown by FIGS. 7 and 8. Here the lamination is assembled by slitting and interfitting metal strips 16 and 17 in egg crate fashion with each strip having a bent-out tab 16a and 17a, respectively. These tabs are located adjacent to terminations of the slits formed by the described sling, the slits being shown at 16b in the case of the strips 16 in FIG. 7. As shown by FIG. 8 the arrangement of tabs may be such that the tabs 16a and 17a are arranged catacornered so that there is one tab for each of the corners of the egg crate or honeycomb assembly.

In this instance the immersion in the liquid may be effected by spraying the assembled honeycomb construction. In any event the idea is to apply the liquid, such as the water solution of flux, to not only the end portions but also to the surfaces of each of the tabs 16a and 17a.

The immersion in the powdered brazing metal may be effected by showering the brazing metal downwardly on the honeycomb or egg crate assembly with the latter arranged with its passages vertical. In this way the powdered metal strikes to and adheres to the edges and the tabs 16a and 17a. Most of the powder that strikes the vertical sides of the passages will tend to continue falling. In any event, the objective is to coat the edge portions and the tabs with the powdered brazing metal.

It is to be noted that the tabs are partially severed portions of the strip which are bent inwardly and so as to angle upwardly. The tab portions 16a form what are in effect pockets or reservoirs facing in one direction while the tabs 17a provide the same effect but facing in the opposite direction. Therefore, each seam formed by the slit and interfitted parts is provided with its little reservoir of powdered brazing metal stuck in place by the previously applied liquid which is thereafter dried to hold the brazing metal. During the showering of those tabs which are slanting downwardly relatively little powdered brazing metal adheres thereto, whereas the upwardly facing ones act like little buckets to catch and retain the powder. The arrangement is such that these reservoirs face the seams which must be brazed to produce an integral assembly.

Now during the brazing action, previously described, and with an appropriate time and temperature correlationship, these little reservoirs of brazing metal become molten and the cracks and seams which they adjoin function to draw this metal by capillary attraction throughout the length of the seam. This seam or crack is naturally of a very small dimension and, therefore, provides the capillary attraction required to draw the brazing metal along the seam. Then, of course, the tabs should be dimensioned and bent so as to provide enough metal to run the length of the seam in each instance.

The physical properties of the liquid used should be such as to anchor the particles of brazing powder where they belong. The following solution, by weight, may be used:

| | Parts |
|---|---|
| Potassium hydroxide | 1 |
| "Handy Flux" | 9 |
| Water | 91 |

The "Handy Flux" component, manufactured by Handy and Harman, has the following (dry basis) analysis:

| | Percent |
|---|---|
| Potassium fluoride | 40 |
| Boric acid | 30 |
| Sodium borate | 30 |

The brazing alloy used may be a low temperature brazing alloy of relatively fine particle size and of the following composition, by weight:

| | Percent |
|---|---|
| Silver | 50 |
| Copper | 15.5 |
| Zinc | 16.5 |
| Cadmium | 18 |

Other brazing alloys may be used. As previously indicated hydrogen brazing methods may be practiced.

I claim:

1. An all-metal honeycomb laminate making process including assembling a metal honeycomb lamination, applying brazing metal to the edges of said lamination, locating a sheet metal lamination on said edges, enclosing said laminations with a metal enclosure providing a sheet metal diaphragm superimposed on said sheet lamination, exhausting the atmosphere from said enclosure so that external atmospheric pressure causes flexing of said diaphragm and sheet lamination and causes the latter to abut substantially all of said edges, applying brazing heat to said diaphragm to cause said brazing metal to braze said laminations together while said enclosure is maintained exhausted to a degree holding said sheet lamination and edges in abutting relation, and thereafter removing the resulting brazed all-metal laminate from said enclosure.

2. An all-metal honeycomb laminate making process including assembling a metal honeycomb lamination, wetting the edges of said lamination with a liquid which has adhesive properties with respect to powdered brazing metal, immersing said edges in powdered brazing metal while said edges are wet with said liquid, so as to cause particles of said powder to adhere to said edges, locating a sheet metal lamination on said edges, enclosing said laminations with a metal enclosure providing a sheet metal diaphragm superimposed on said sheet lamination, exhausting the atmosphere from said enclosure so that external atmospheric pressure causes flexing of said diaphragm and sheet lamination and causes the latter to abut substantially all of said edges, applying brazing heat to said diaphragm to cause said particles to braze said laminations together while said enclosure is maintained exhausted to a degree holding said sheet lamination and edges in abutting relation and thereafter removing the resulting brazed all-metal laminate from said enclosure, said honeycomb lamination being assembled by superimposing corrugated metal strips so that the valley portions of one strip contact the hill portions of another with said portions parallel to each other, and spot welding said contacting portions together.

3. An all-metal honeycomb laminate making process including assembling a metal honeycomb lamination, wetting the edges of said lamination with a liquid which has adhesive properties with respect to powdered brazing metal, immersing said edges in powdered brazing metal while said edges are wet with said liquid, so as to cause particles of said powder to adhere to said edges, locating a sheet metal lamination on said edges, enclosing said laminations with a metal enclosure providing a sheet metal diaphragm superimposed on said sheet lamination, exhausting the atmosphere from said enclosure so that external atmospheric pressure causes flexing of said diaphragm and sheet lamination and causes the latter to abut substantially all of said edges, applying brazing heat to said diaphragm to cause said particles to braze said laminations together while said enclosure is maintained exhausted to a degree holding said sheet lamination and edges in abutting relation, and thereafter removing the resulting brazed all-metal laminate from said enclosure, said honeycomb lamination being assembled by slitting and interfitting metal strips in egg crate fashion with each strip having a bent-out tab formed by partially severing and bending of the strip metal and with said tabs located adjacent to the terminations of the slits formed by said slitting, said tabs also being wet with said liquid prior to said immersing so that the latter deposits brazing metal particles on said tabs to form reservoirs of brazing metal, said application of heat causing said reservoirs of metal to fuse and by capillary attraction to be drawn along said slits so as to braze said strips together.

4. An all-metal honeycomb laminate making process including assembling a metal honeycomb lamination, wetting the edges of said lamination with a liquid which has adhesive properties with respect to powdered brazing metal, immersing said edges in powdered brazing metal while said edges are wet with said liquid, so as to cause particles of said powder to adhere to said edges, locating a sheet metal lamination on said edges, enclosing said laminations with a metal enclosure providing a sheet metal diaphragm superimposed on said sheet lamination, exhausting the atmosphere from said enclosure so that external atmospheric pressure causes flexing of said diaphragm and sheet lamination and causes the latter to abut substantially all of said edges, applying brazing heat to said diaphragm to cause said particles to braze said laminations together while said enclosure is maintained exhausted to a degree holding said sheet lamination and edges in abutting relation, and thereafter removing the resulting brazed all-metal laminate from said enclosure, said liquid comprising a water solution of brazing flux and being dried after said immersing and prior to locating said sheet metal lamination on said edges.

5. An all-metal honeycomb laminate making process including assembling a metal honeycomb lamination, wetting the edges of said lamination with a liquid which has adhesive properties with respect to powdered brazing metal, immersing said edges in powdered brazing metal while said edges are wet with said liquid, so as to cause particles of said powder to adhere to said edges, locating a sheet metal lamination on said edges, enclosing said laminations with a metal enclosure providing a sheet metal diaphragm superimposed on said sheet lamination, exhausting the atmosphere from said enclosure so that external atmospheric pressure causes flexing of said diaphragm and sheet lamination and causes the latter to abut substantially all of said edges, applying brazing heat to said diaphragm to cause said particles to braze said laminations together while said enclosure is maintained exhausted to a degree holding said sheet lamination and edges in abutting relation, and thereafter removing the resulting brazed all-metal laminate from said enclosure, said honeycomb laminate being positioned with its passages vertical and said immersing being effected by showering said powdered brazing metal so that said powdered brazing metal falls through said passages excepting for the portion adhering to said edges.

6. An all-metal honeycomb laminate making process including assembling a metal honeycomb lamination, wetting the edges of said lamination with a liquid which has adhesive properties with respect to powdered brazing metal, immersing said edges in powdered brazing metal while said edges are wet with said liquid, so as to cause particles of said powder to adhere to said edges, locating a sheet metal lamination on said edges, enclosing said laminations with a metal enclosure providing a sheet metal diaphragm superimposed on said sheet lamination, exhausting the atmosphere from said enclosure so that external atmospheric pressure causes flexing of said diaphragm and sheet lamination and causes the latter to abut substantially all of said edges, applying brazing heat to said diaphragm to cause said particles to braze said laminations together while said enclosure is maintained exhausted to a degree holding said sheet lamination and edges in abutting relation, and thereafter removing the resulting brazed all-metal laminate from said enclosure, said wetting being effected by dipping said edges only into a shallow layer of said liquid so as to confine said wetting to said edges and the honeycomb laminate portion very close thereto, and said immersing being effected by dipping said wet edges in a shallow layer of said powdered brazing metal.

7. An all-metal honeycomb laminate making process including assembling a metal honeycomb lamination, wetting the edges of said lamination wth a liquid which has adhesive properties with respect to powdered brazing metal, immersing said edges in powdered brazing metal while said edges are wet with said liquid, so as to cause particles of said powder to adhere to said edges, locating a sheet metal lamination on said edges, enclosing said laminations with a metal enclosure providing a sheet metal diaphragm super-imposed on said sheet lamination, exhausting the atmosphere from said enclosure so that external atmospheric pressure causes flexing of said diaphragm and sheet lamination and causes the latter to abut substantially all of said edges, applying brazing heat to said diaphragm to cause said particles to braze said laminations together while said enclosure is maintained exhausted to a degree holding said sheet lamination and edges in abutting relation, and thereafter removing the resulting brazed all-metal laminate from said enclosure, said honeycomb lamination being assembled by slitting and interfitting metal strips in egg crate fashion with each strip having a bent-out tab formed by partially severing and bending of the strip metal and with said tabs located adjacent to the terminations of the slits formed by said slitting, said tabs also being wet with said liquor prior to said immersing so that the latter deposits brazing metal particles on said tabs to form reservoirs of brazing metal, said application of heat causing said reservoirs of metal to fuse and by capillary attraction to be drawn along said slits so as to braze said strips together, said wetting being effected by enveloping said honeycomb lamination in said liquid and said immersing being effected with said laminate positioned with its passages vertical and showering said powdered brazing metal so that said metal adheres mainly to said edges and tabs while largely sliding down the wall portions of said honey-comb lamination therebetween.

8. An all-metal honeycomb laminate making process inclding assembling a metal honeycomb lamination, wetting the edges of said lamination with a liquid which has adhesive properties with respect to powdered brazing metal, immersing said edges in powdered brazing metal while said edges are wet with said liquid, so as to cause particles of said powder to adhere to said edges, locating a sheet metal lamination on said edges, enclosing said laminations with a metal enclosure providing a sheet metal diaphragm superimposed on said sheet lamination, exhausting the atmosphere from said enclosure so that external atmospheric pressure causes flexing of said diaphragm and sheet lamination and causes the latter to abut substantially all of said edges, applying brazing heat to said diaphragm to cause said particles to braze said laminations together while said enclosure is maintained exhausted to a degree holding said sheet lamination and edges in abutting relation, and thereafter removing the resulting brazed all-metal laminate from said enclosure, gas being passed through said enclosure at sub-atmospheric pressure to assist in said brazing without releasing said sheet lamination from said edges.

References Cited in the file of this patent

UNITED STATES PATENTS

| | | |
|---|---|---|
| 2,053,135 | Dalton | Sept. 1, 1936 |
| 2,056,563 | Budd et al. | Oct. 6, 1936 |
| 2,081,603 | Sandberg | May 25, 1937 |
| 2,258,858 | Meadowcroft | Oct. 14, 1941 |
| 2,395,205 | Watter | Feb. 19, 1946 |
| 2,481,046 | Scurlock | Sept. 6, 1949 |
| 2,609,068 | Pajack | Sept. 2, 1952 |
| 2,700,632 | Ackerlind | Jan. 25, 1955 |
| 2,746,139 | Van Pappelendam | May 22, 1956 |
| 2,756,496 | Holland | July 31, 1956 |
| 2,816,355 | Herman | Dec. 17, 1957 |
| 2,845,698 | Giovannucci et al. | Aug. 5, 1958 |